United States Patent
Riddering et al.

(10) Patent No.: US 10,366,719 B1
(45) Date of Patent: Jul. 30, 2019

(54) BOOSTED PREHEAT TRAJECTORY TO OBTAIN DESIRED CLEARANCE BEFORE WRITING TO DISK

(71) Applicant: Seagate Technology LLC, Cupertino, CA (US)

(72) Inventors: Jason W. Riddering, Prior Lake, MN (US); Dustin Mark Cvancara, Prior Lake, MN (US); Kenneth A. Haapala, Plymouth, MN (US); Eric John McCalla, Watertown, MN (US); Wenzhong Zhu, Apple Valley, MN (US); Bin Huang, Savage, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/925,927

(22) Filed: Mar. 20, 2018

(51) Int. Cl.
 *G11B 5/09* (2006.01)
 *G11B 5/60* (2006.01)

(52) U.S. Cl.
 CPC .................... *G11B 5/607* (2013.01)

(58) Field of Classification Search
 None
 See application file for complete search history.

(56) References Cited

U.S. PATENT DOCUMENTS

| | | | |
|---|---|---|---|
| 6,999,265 B1 | 2/2006 | Schreck et al. | |
| 7,426,090 B2 | 9/2008 | Yamashita et al. | |
| 7,522,369 B1* | 4/2009 | Rahgozar | G11B 5/607 360/75 |
| 9,019,646 B2 | 4/2015 | Rausch et al. | |
| 9,240,205 B1* | 1/2016 | Gao | G11B 7/1263 |
| 9,472,225 B2 | 10/2016 | Lou et al. | |
| 9,824,699 B1* | 11/2017 | Lou | G11B 5/09 |
| 2003/0179480 A1* | 9/2003 | Sako | G11B 5/02 360/46 |
| 2003/0234997 A1* | 12/2003 | Ikekame | G11B 5/012 360/46 |
| 2013/0083423 A1* | 4/2013 | Shiroishi | G11B 5/3146 360/75 |
| 2013/0279039 A1* | 10/2013 | Shiroishi | G11B 20/1217 360/48 |
| 2014/0126077 A1* | 5/2014 | Contreras | G11B 5/02 360/46 |

* cited by examiner

*Primary Examiner* — Peter Vincent Agustin
(74) *Attorney, Agent, or Firm* — Hollingsworth Davis, LLC

(57) ABSTRACT

A clearance heater of a write head is engaged with a boosted current that exceeds a steady-state current. The steady-state current causes the write head to maintain a desired clearance over a disk during writing, the boosted current being applied before a start of the writing. The boosted current is monotonically decreased before the start of the writing and the steady-state current is applied to the heater after the start of the writing.

17 Claims, 5 Drawing Sheets

BOOSTED PREHEAT TRAJECTORY TO OBTAIN DESIRED CLEARANCE BEFORE WRITING TO DISK

SUMMARY

The present disclosure is directed to the use of a boosted pre-heat clearance to obtain desired clearance before writing to a disk. In one embodiment, a clearance heater of a write head is engaged with a boosted current that exceeds a steady-state current. The steady-state current causes the write head to maintain a desired clearance over a disk during writing, the boosted current being applied before a start of the writing. The boosted current is monotonically decreased before the start of the writing and the steady-state current is applied to the heater after the start of the writing.

In another embodiment, a steady-state current is determined that when, applied to a heater of a write head, will obtain a desired clearance between the write head and a disk. A write start time is determined at which writing to the disk via the write head is to begin. Before the write start time, a boosted current profile is applied to the heater until a preheat stop time. The preheat stop time is at or after the write start time. The boosted current profile has an amplitude greater than that of the steady-state current. The steady-state current is applied to the clearance heater after the preheat stop time.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to data storage devices that utilize magnetic storage media, e.g., disks. These devices use read/write heads that float over the surface of the disk, generally separated by a thin layer of air or other gas (e.g., helium). The heads have air-bearing surfaces (ABS) that interact with the air over the spinning disk and maintain a predetermined spacing. The heads in modern disk drives often have additional features to actively control the clearance between the read and write transducers of the heads, thereby providing finer control over these spacings than can be achieved by the air bearings alone. These clearances may sometimes be referred to as fly height, head-to-media clearance, head-to-media spacing, etc.

Many read/write heads utilize an embedded heater (e.g., resistive heater) to induce thermal protrusion in order to control head-to-media clearance. A single heater may be used for both read and write operations, or separate heaters may be used for read and write operations, respectively. The amount of current applied to the heater may be determined based on an open-loop and/or closed loop controller. The system controller will apply the heater current at or before reading or writing operations in order to set the desired clearance. The performance of the read and write transducers is dependent on the clearance between the transducers and the disk, and so these operations will not commence until clearance is at or near a desired level. It may take some amount of time to achieve this desired clearance, which can impact performance if the time is too long. Apparatuses and methods are described below that can reduce the time it takes to achieve a target clearance for reading or writing.

Figure 1:
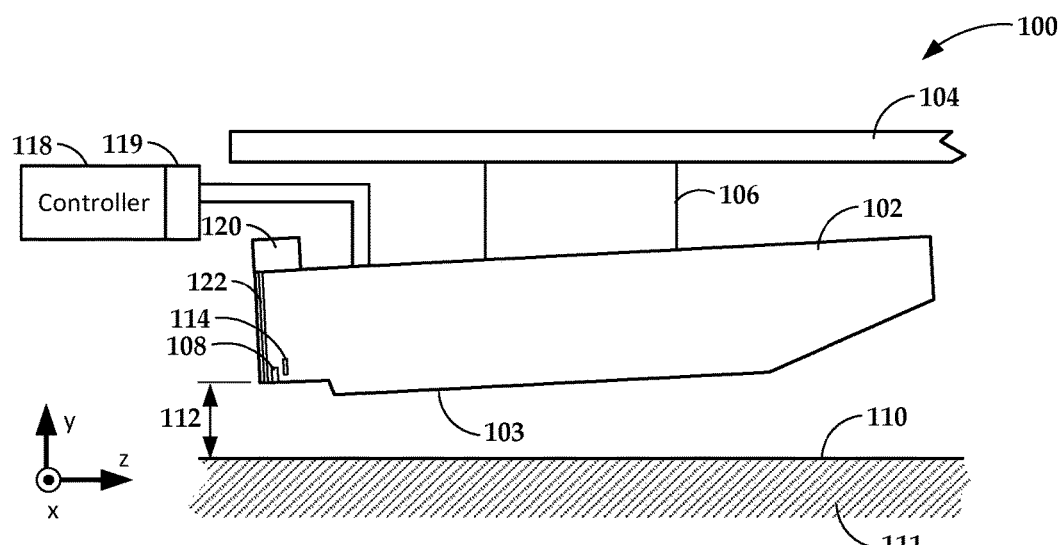
FIG. 1 is a block diagram of an apparatus according to an example embodiment.

In FIG. 1, a block diagram shows an apparatus 100 using clearance control according to an example embodiment. The apparatus 100 includes a read/write head 102, which may also be referred to herein as a slider, write head, read head, recording head, etc. The read/write head 102 is coupled to an arm 104 by way of a suspension 106, e.g., a gimbal. The read/write head 102 includes read/write transducers 108 at a trailing edge that are held proximate to a surface 110 of a magnetic recording medium 111, e.g., a magnetic disk. When the read/write head 102 is located over surface 110 of recording medium 111, a flying height 112 is maintained between the read/write head 102 and the surface 110 by a downward force of arm 104. This downward force is counterbalanced by an air cushion that exists between the surface 110 and an ABS 103 (also referred to herein as a "media-facing surface") of the read/write head 102 when the recording medium 111 is rotating.

In order to provide control of the clearance between the read/write transducers 108 and the recording medium 111, one or more clearance actuators 114 (e.g., clearance heaters) are formed in the read/write head 102. A current applied to the clearance heater 114 induces a local protrusion which varies the clearance. The amount of current applied to the clearance heater 114 may vary based on which of the read/write transducers 108 are in use, and may also be adjusted to account for irregularities in the media surface 110, changes in ambient temperature, location of the read/write head 102 over the medium 111, etc. Thermal sensors (not shown) may also be included in the read/write head 102 to facilitate measuring clearances, e.g., by measuring a thermal profile as a function of heater power.

The apparatus 100 includes a controller 118 coupled to the read/write transducers 108, as well as other components of the read/write head 102, such as heaters 114, sensors, etc. The controller 118 may be part of general- or special-purpose logic circuitry that controls the functions of a storage device that includes at least the read/write head 102 and recording medium 111. The controller 118 may include or be coupled to an interface circuit 119 that may include preamplifiers, buffers, filters, digital-to-analog converters, analog-to-digital converters, decoders, encoders, etc., that are operable to electrically couple the logic of the controller 118 to components integrated with the read/write head 102 and enable communications therebetween.

When the controller 118 receives a command to write a data sector, minimizing the time to be ready to write will maximize write throughput performance, e.g., by reducing latency. The head 102 is considered ready to write when it has settled on the track and the heater 114 is causing protrusion to the target clearance using preheat. The time to achieve target clearance with preheat can therefore affect drive write performance. High passive fly height, combined with slower protrusion time constants on some head designs can lead to significantly extended preheat times and cause loss in write throughput performance. The same concepts can also be applied to read clearance actuators/heaters, although failures to reach target clearance will not have the same impact for reads as it will for writes, the latter risking loss of data. Thus, for example, a read heater preheat profile may be less aggressive than the write preheat profile.

Figure 2:
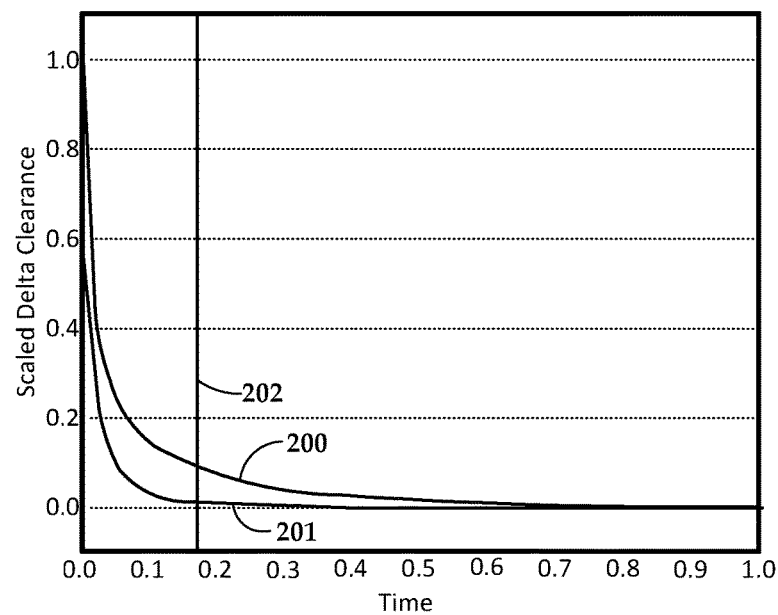
FIG. 2 is a graph showing thermal responses of heads according to example embodiments.

In FIG. 2, a graph shows the protrusion responses 200, 201 of first and second example heads with different starting fly height and protrusion time constants. The second head 201 has a lower passive fly height and faster protrusion time constants. At the desired write time of 0.17 (which is in arbitrary units), which is represented by vertical line 202, the second head 201 has achieved the target clearance with a very small error. At the same time 202, the first head 200 has significant clearance error. To achieve the same level of clearance error as the second head 201, the first head 200 must wait until ~0.65 (arbitrary units), ~3.8 times longer. It is undesirable to suspend drive operations while waiting the extra time needed by head 200 to achieve target clearance.

In order to achieve target clearance during preheat more quickly, the head heater is overdriven for a period of time to accelerate the protrusion. In this way, a protrusion profile closer to head 201 can be obtained for heads that have different and/or slower thermal response characteristics. Depending on the head design, the heater overshoot profile may need to extend beyond preheat and into the actual writing of data. The current profile should aim to avoid clearance undershoot during preheat. A profile is used that achieves target clearance at the desired write time without clearance undershoot. This profile is referred to herein as a rapid-approach, pre-heat trajectory.

Figure 3:
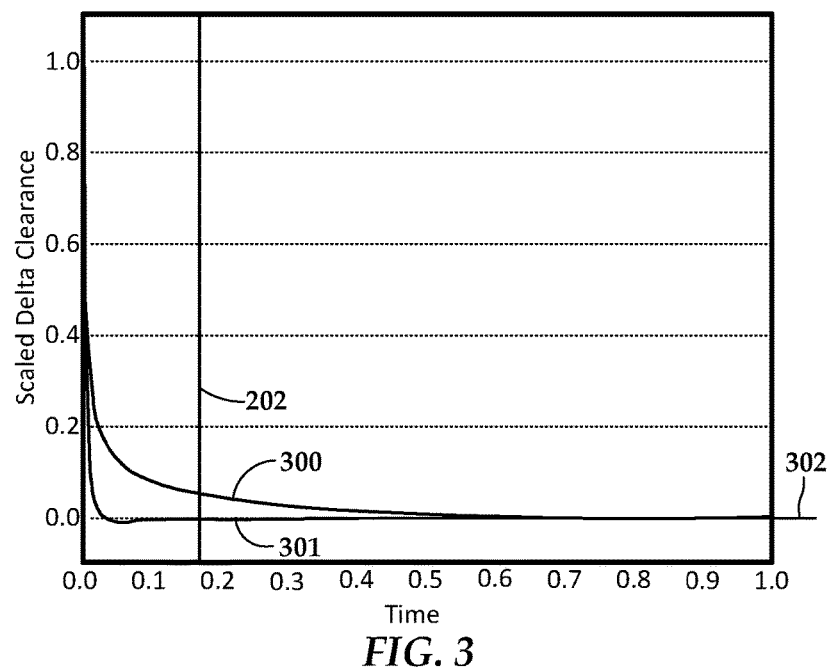
FIG. 3 is a graph showing clearances with and without a boosted pre-heat according to an example embodiment
Figure 4:
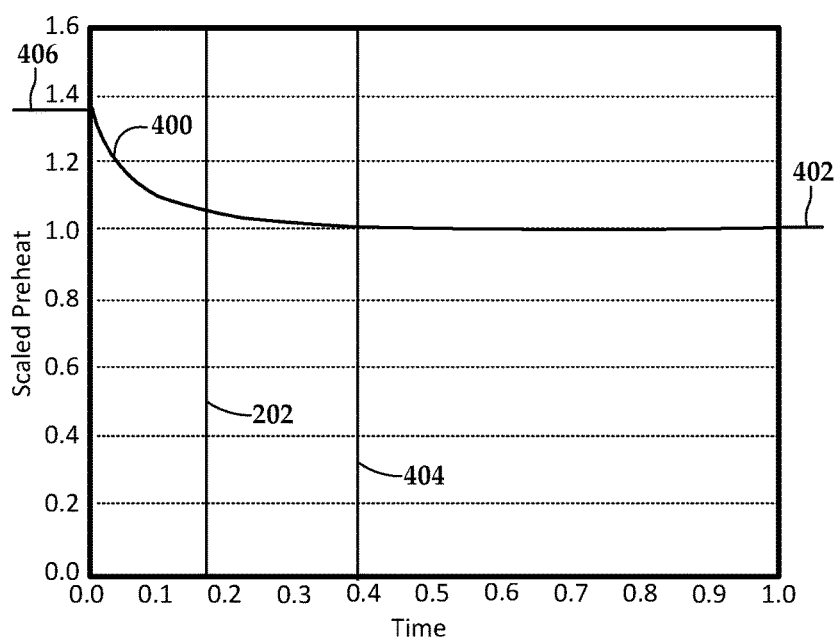
FIG. 4 is a graph showing the boosted pre-heat profile according to an example embodiment.

In FIG. 3, a graph shows clearance of a write head according to an example embodiment with boosted preheat profile applied (curve 301) and without the boosted preheat profile applied (curve 300). In FIG. 4, a graph shows the scaled value of the boosted profile 400 according to an example embodiment, which is also referred to as a rapid-approach, pre-heat trajectory. A steady-state current 402 is determined that, when applied to a heater of the write head, will obtain a desired clearance between the write head and a disk. The steady-state current 402 may be determined, for example, in initial calibration of the disk drive and may be adjusted during drive operation. In FIG. 4, the values are scaled to the steady-state current 402, such that heater currents greater than the steady-state current 402 are greater than one and heater currents less than steady-state current 402 are less than one.

Also defined is the write start time 202 at which writing to the disk via the write head is to begin. Before the start time, a boosted current profile 400 is applied to the heater until a preheat stop time 404. The boosted current profile 404 in this example has a monotonically decreasing amplitude as it approaches the preheat stop time 404. The amplitude of the boosted current profile 400 is greater than that of the steady-state current before the write start time 202, e.g., the scaled value of the profile 400 is greater than one before the write start time 202. In this example, the starting amplitude 406 of the boosted current profile 400 is around 1.35 times that of the steady state current 402, and may be up to 1.4 or higher (or less than 1.3) depending on the head character-istics. The start amplitude 406 may also vary based on the time available to achieve the desired clearance, which is generally defined by the time period between when the boost begins (time=0.0 in this example) and the write start time 202. If more time is available to reach the target clearance, then the start amplitude 406 may be lower, and vice versa.

The steady-state current 402 is applied to the heater after the preheat stop time 404, in which case the head will attain a steady state clearance value during the remainder of the write operations, as indicated by clearance value 302 in FIG. 3. Without the rapid-approach, pre-heat trajectory profile 400 applied, significant clearance error may be observed at curve 300 at or near the desired write time 202, whereas the error is smaller for curve 301.

With the profile 400 applied, target clearance is achieved very quickly and in fact writing could occur earlier than time 202 without a clearance penalty. Due to the nature of the time constants in this example head and the constraint that undershoot is not desirable, the profile 400 may be held above the steady state current 402 beyond the desired write time 202 to maintain flat clearance. In such a case, the pre-heat end time 404 is after the write start time 202.

Since the nature of the head response is exponential, and may include multiple time constants, the rapid-approach, pre-heat trajectory heater overshoot profile may assume an exponential shape as seen in profile 400 in FIG. 4. In this example, the boosted current profile 400 smoothly transitions to the steady-state current 402. However, it may be desirable to tune the profile to other shapes. For instance, if the goal is to achieve a target clearance error at a specific write time and not sooner, less overshoot may be desired at the start of the profile. This could be advantageous, for example, if less heating stress is desired or a reduced probability of head-to-disk contact is desired.

Figure 5:
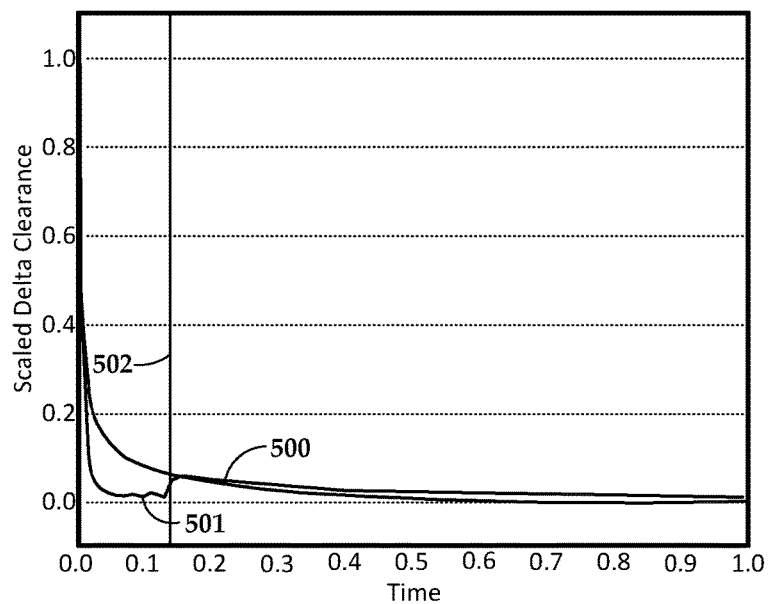
FIG. 5 is a graph showing clearances with and without a boosted pre-heat profile according to another example embodiment

In FIG. 5, a graph shows clearance vs protrusion time with and without the rapid-approach, pre-heat trajectory profile applied (plots 501 and 500, respectively), but used in preheat only. Note that a different target write time 502 is shown here of about 1.3 compared to FIGS. 3 and 4, and this start time 502 also defines the end of pre-heat in this example. The response 501 with the pre-heat does not exhibit overshoot, although shows some undershoot near the write start time 502.

Figure 6:
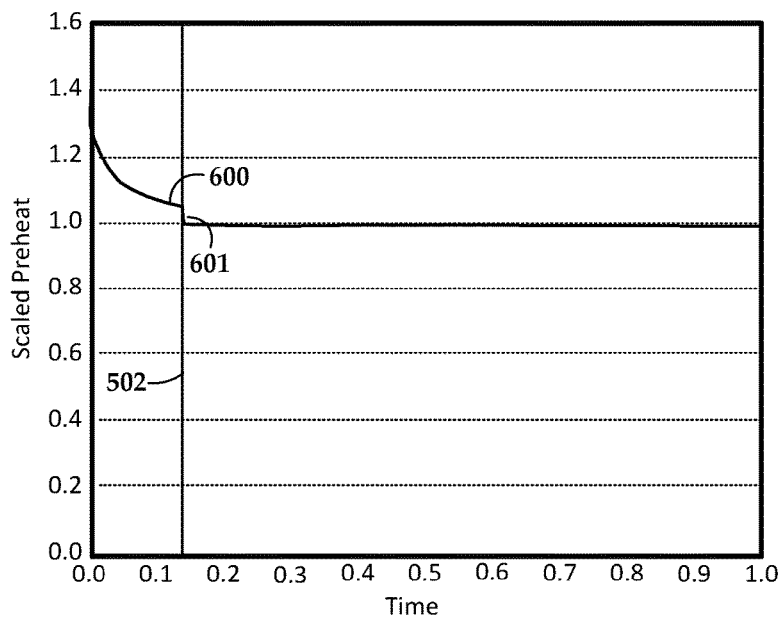
FIG. 6 is a graph showing the boosted pre-heat profile according to another example embodiment.

The graph in FIG. 6 shows the boosted, pre-heat profile 600 used to obtain the clearance 501 in FIG. 5. Note the profile 600 includes a step 601 at or near the target write start time 502. If the head contains both a fast and slow time constant, and the profile is only applied during preheat (terminating at or near write start time 502), the head may start to retract as soon as the profile is removed and clearance errors can develop. For this reason it may desirable to continue the rapid-approach, pre-heat trajectory profile after the start of the write to maintain the target clearance if these clearance errors are a concern.

Figure 7:
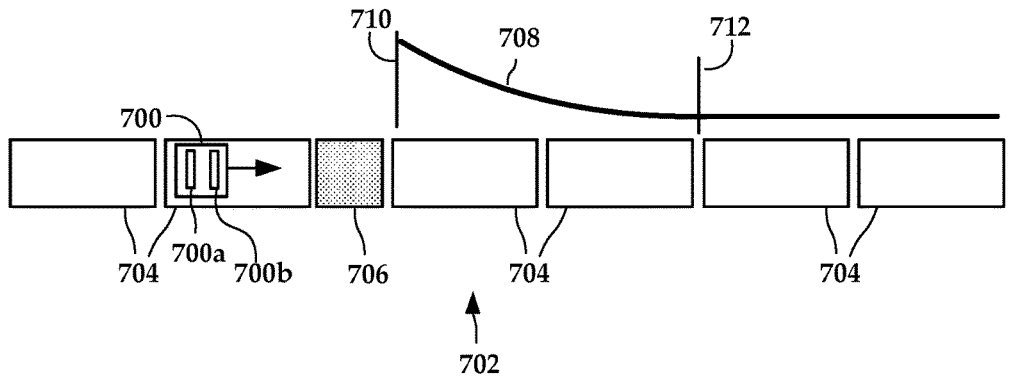
FIG. 7 is a diagram showing pre-heat application relative to a track according to an example embodiment.

Note that the pre-heat profiles shown above are applied during a known time period, e.g., between time=0.0 and time 404 in FIG. 4. Generally, this time period may span multiple data sectors. An example is shown in FIG. 7, where transducers 700 of a write head are shown traversing a track 702 on a disk according to an example embodiment. While the transducers 700 are described as traversing the track 702 (e.g., as indicated by the arrow extending from transducers 700) it will be understood that the transducers 700 are generally fixed in the direction indicated by the arrow, and the disk moves under the transducers 700 due to the disk's rotation. Thus the track 702 will be moving underneath the transducers 700 in a direction opposite from the arrow.

Nonetheless, for purposes of convenience, this relative motion may be described herein as the transducers 700 (and write head) traversing the track 702.

The transducers 700 include both a read transducer 700a and a write transducer 700b, and are not drawn to scale. The track 702 includes user data sectors 704 which are represented by the white rectangles, and servo data sectors 706 which are represented as shaded rectangles. The servo data sectors 706 are read-only, and the write head is controlled so as to prevent writing over the data sectors 706 by the write transducer 700b. The read transducer 700a will read the servo data sector 706 during both reading and writing operations, assuming the latter operation spans servo sectors. In the latter case, a clearance heater will cause a protrusion that causes the read transducer 700a to obtain an optimum clearance from the track 702 to read the servo data sector 706. The same heater (or a different heater) will then transition to cause the write transducer 700b to protrude to its optimum clearance to begin writing the user data sector 704 that immediately follows the servo data sector 706.

As indicated by boosted pre-heat, write heater profile 708, the increase in clearance heater current may begin at time 710, which is at the start of a data sector 704. This gives the heater an amount of time corresponding to the downtrack length of a number of data sectors 704 before reaching the desired write clearance for the target data sector 704, which is written starting at time 712. Note that the preheat time period between times 710 and 712 may span servo sectors 706 in some cases.

Figure 8:
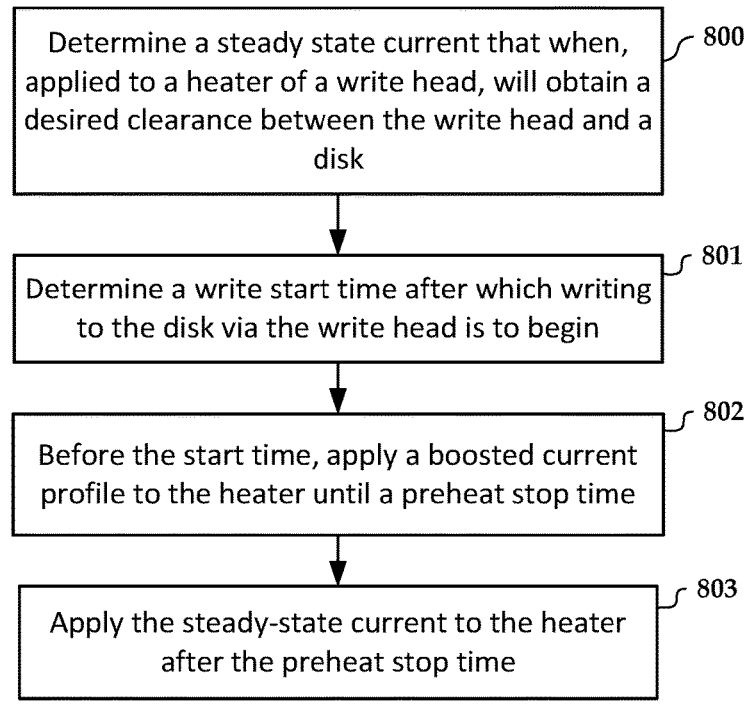
FIG. 8 is a flowchart of a method according to an example embodiment.

In FIG. 8, a flowchart illustrates a method according to another example embodiment. The method involves determining 800 a steady-state current that when, applied to a clearance heater of a write head, will obtain a desired clearance between the write head and a disk. A write start time is determined 801, at which writing to the disk via the write head is to begin. Before the write start time, a boosted current profile is applied 802 to the clearance heater until a preheat stop time. The boosted current profile has a monotonically decreasing amplitude as it approaches the preheat stop time. The amplitude of the boosted current profile is greater than that of the steady-state current before the start time. The steady-state current is applied 803 to the clearance heater after the preheat stop time.

Figure 9:
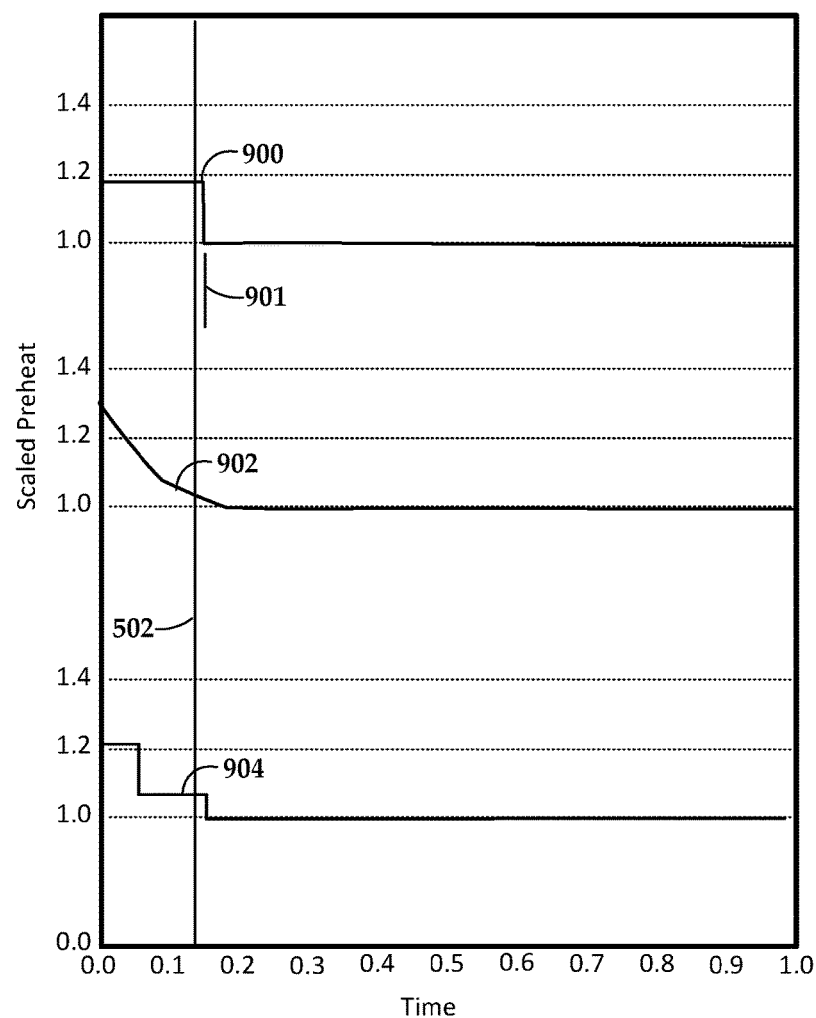
FIG. 9 is a graph of boosted pre-heat profiles according to additional example embodiments.

The rapid-approach, pre-heat trajectory, overshoot profiles shown above use curves, e.g., exponential curves. There are many other possible overshoot profile shapes. In FIG. 9, a graph shows alternate profiles to provide pre-heat boost. Curve 900 includes a single step function that applied is to reduce the heating time before writing at write start time 502. Note the step ends at time 901 which is after the write start time 502. The amplitude of the step in the boost curve 900 may be approximately the time-average of an equivalent exponential curve over the pre-heat period, e.g., curve 400 in FIG. 4, where such exponential curve is used as a performance model for the particular head. The end time 901 of the step in curve 900 may be found by testing or calculation based on an equivalent exponential curve.

As seen by curve 902 in FIG. 9, portions of the curve may be represented individually by linear profiles and joined together, e.g., piecewise linear profile. Again, this curve 902 includes boosted current past the write start time 502, and may have performance approximate to an exponential curve, e.g., by making the area under each segment equal to the time integral of corresponding portions of the exponential curve. As seen by curve 904, a two-step function may also be used, and be obtained similarly as described for curve 900, but over different segments of an exponential curve used as a performance model. This can be extended to more than two steps. These rapid-approach, pre-heat trajectory overshoot profiles may be handled by the drive firmware, or directly by hardware.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
engaging a resistive clearance heater embedded near an air bearing surface of a read/write head with a boosted current that exceeds a steady-state current, the steady-state current applied to the resistive clearance heater causing the write head to maintain a desired clearance over a disk during reading and writing, the boosted current applied before and after a start of the reading and the writing;
decreasing the boosted current according to a profile that has two or more steps that approximate a monotonically decreasing curve; and
applying the steady-state current to the resistive clearance heater after the start of the reading and the writing.

2. The method of claim 1, wherein the monotonically decreasing curve comprises an exponential curve.

3. The method of claim 1, wherein a start amplitude of the boosted current is up to 1.4 times that of the steady-state current.

4. The method of claim 1, wherein the boosted current transitions to the steady state current via a step after the start of the writing.

5. The method of claim 1, wherein, during the reading, the decreasing of the boosted current according to the profile is less aggressive than during the writing.

6. A method, comprising:
determining a steady-state current that when, applied to a resistive clearance heater embedded near an air bearing surface of a read/write head, will obtain a desired clearance between the read/write head and a disk;

determining a read start time at which reading from the disk via the read/write head is to begin;

before the read start time, applying a boosted current profile to the resistive clearance heater until a preheat stop time, the preheat stop time being after the read start time, the boosted current profile having an amplitude greater than that of the steady-state current and having multiple steps that approximate a monotonically decreasing curve; and applying the steady-state current to the resistive clearance heater after the preheat stop time.

7. The method of claim 6, wherein the boosted current profile approximates an exponential curve.

8. The method of claim 6, wherein an elapsed time between a boost start time of the boosted current profile and the read start time spans multiple data sectors.

9. The method of claim 6, wherein a start amplitude of the boosted current profile is up to 1.4 times that of the steady-state current.

10. The method of claim 6, wherein the boosted current profile transitions to the steady state current via a step after the read start time.

11. The method of claim 6, further comprising:

determining a write start time at which writing to the disk via the read/write head is to begin;

before the write start time, applying a second boosted current profile to the resistive clearance heater until a second preheat stop time, the second preheat stop time being after the write start time, the second boosted current profile having an amplitude greater than that of the steady-state current and having multiple steps that approximate a second monotonically decreasing curve; and applying the steady-state current to the resistive clearance heater after the second preheat stop time.

12. The method of claim 11, wherein the second boosted current profile is more aggressive than the boosted current profile.

13. An apparatus, comprising:

an interface circuit operable to communicate with a write head, the write head comprising, embedded near an air-bearing surface of the write head, a resistive heater that sets a clearance between the read/write head and a disk; and a controller coupled to the interface circuit, the controller operable to:

engage the resistive heater with a boosted current that exceeds a steady-state current, the steady-state current causing the read/write head to maintain a desired clearance over the disk during reading and writing, the boosted current applied before and after the start of the reading and the writing;

decreasing the boosted current according to a first profile that has two or more steps that approximate a monotonically decreasing curve; and applying the steady-state current to the resistive heater after the start of the writing.

14. The apparatus of claim 13, wherein the monotonically decreasing curve comprises an exponential curve.

15. The apparatus of claim 13, wherein a start amplitude of the boosted current s up to 1.4 times that of the steady-state current.

16. The apparatus of claim 13, wherein the boosted current transitions to the steady state current via a step after the start of the writing.

17. The apparatus of claim 13, wherein, during the reading, the decreasing of the boosted current according to the profile is less aggressive than during the writing.

* * * * *